United States Patent
Gupta et al.

(10) Patent No.: US 7,487,369 B1
(45) Date of Patent: Feb. 3, 2009

(54) LOW-POWER CACHE SYSTEM AND METHOD

(75) Inventors: Mayank Gupta, Sunnyvale, CA (US);
Edward T. Pak, Saratoga, CA (US);
Javier Villagomez, San Jose, CA (US);
Peter H. Voss, Aromas, CA (US)

(73) Assignee: RMI Corporation, Cupertino, CA (US)

( * ) Notice: Subject to any disclaimer, the term of this patent is extended or adjusted under 35 U.S.C. 154(b) by 0 days.

(21) Appl. No.: 09/562,071

(22) Filed: May 1, 2000

(51) Int. Cl.
*G06F 1/32* (2006.01)
*G06F 12/00* (2006.01)

(52) U.S. Cl. ....................... 713/300; 711/118
(58) Field of Classification Search ................ 713/300; 711/118
See application file for complete search history.

(56) References Cited

U.S. PATENT DOCUMENTS

| | | | | |
|---|---|---|---|---|
| 5,029,126 A | * | 7/1991 | Yamaguchi | 365/49 |
| 5,550,774 A | * | 8/1996 | Brauer et al. | 365/189.02 |
| 5,623,627 A | * | 4/1997 | Witt | 711/122 |
| 5,860,106 A | * | 1/1999 | Domen et al. | 713/324 |
| 6,021,461 A | * | 2/2000 | Dhong et al. | 711/105 |
| 6,212,106 B1 | * | 4/2001 | Kurotsu | 365/189.07 |
| 6,601,155 B2 | * | 7/2003 | Krimer et al. | 711/205 |

FOREIGN PATENT DOCUMENTS

JP 04186595 A * 7/1992

\* cited by examiner

*Primary Examiner*—Rehana Perveen
*Assistant Examiner*—Eric Chang
(74) *Attorney, Agent, or Firm*—Zilka-Kotab, PC

(57) ABSTRACT

The invention provides a cache architecture that selectively powered-up a portion of data array in a pipelined cache architecture. A tag array is first powered-up, but the data array is not powered-up during this time, to determine whether there is a tag hit from the decoded index address comparing to the tag compare data. If there is a tag hit, during a later time, a data array is then powered-up at that time to enable a cache line which corresponds with the tag hit for placing onto a data bus. The power consumed by the tag represents a fraction of the power consumed by the data array. A significant power is conserved during the time in which the tag array is assessing whether a tag hit occurs while the data array is not powered-on at this point.

19 Claims, 4 Drawing Sheets

LOW-POWER CACHE SYSTEM AND METHOD

BACKGROUND INFORMATION

1. Field of the Invention

The invention relates to integrated circuits, and particularly to memory system designs of a cache architecture.

2. Description of Related Art

In a mobile society at the start of a new millennium, a challenge in designing a compact or handheld device is to extend the battery power duration after a charge-up. A cache is an integral part of a computing system but draws a significant amount of system power. A design trend in the past has a dominant focus on finding new ways to increase the speed of a computing system. However, prolonging a battery power has become a primary focus in the design of wireless and mobile devices.

A cache refers to a storage architecture in integrated circuits and software where the most commonly used data is tagged and stored for quick retrieval. A principle usage of a cache is to speed-up processing of information of an application program. A cache tags a piece of data or information using a tagging algorithm. The tag itself and the related data are stored. When a processor seeks to retrieve a piece of data, the same tagging algorithm is applied to generate a tag in which the tag is used to identify whether the data exists in the cache.

FIG. 1 is a prior art diagram illustrating a conventional two-way associativity cache architecture 10. Cache architecture 10 includes two one-way of associativities 11 and 12. An address decoder 13 decodes an index address 25 for use in a tag array 14, and a separate address decoder 16 is used for a data array 17 in associativity 11. Similarly, an address decoder 19 is used for a tag array 20, and a separate address decoder 22 is used for a data array 23 in associativity 12. The same index line 25 is fed feed to all four address decoders 13, 16, 19, and 22.

When index line-25 is received by cache architecture 10, all four address decoders 13, 16, 19, and 22 are powered-up. A tag look-up and a data look-up are performed simultaneously in tag array 14, data array 17, tag array 20, and data array 23. A comparator 15 compares the tag from tag array 14 with a tag compare data 26 in associativity 11, while a comparator 21 compares the tag from tag array 20 with a tag compare data 26 in associativity 12. One of the two data enables 18 and 24 is enabled to generate the output on a data bus 27. A shortcoming of this conventional cache architecture 10 is that a large amount of power is consumed by simultaneous activation of tag array 14, tag array 20, data array 17, and data array 23. When additional associativities are stacked over existing associativities, cache architecture draws an even greater amount of power as well as causing potential timing problems.

Accordingly, it is desirable to have a cache architecture that is modular and scalable that consumes low-power.

SUMMARY OF THE INVENTION

The invention provides a cache architecture that selectively powered-up a portion of data array in a pipelined cache architecture. A tag array is first powered-up, but the data array is not powered-up during this time, to determine whether there is a tag hit from the decoded index address comparing to the tag compare data. If there is a tag hit, during a later time, a data array is then powered-up at that time to enable a cache line which corresponds with the tag hit for placing onto a data bus. The power consumed by the tag represents a fraction of the power consumed by the data array. A significant power is conserved during the time in which the tag array is assessing whether a tag hit occurs while the data array is not powered-on at this point.

Advantageously, the cache architecture in the present invention reduces power dissipation, increases modularity, and provides scalable associativity. The complexity of the cache architecture is also simplified by sharing circuits among tag and data arrays. Moreover, additional associativity can be added to the cache architecture without incurring additional costs.

DETAILED DESCRIPTION OF PREFERRED EMBODIMENT

Figure 1:
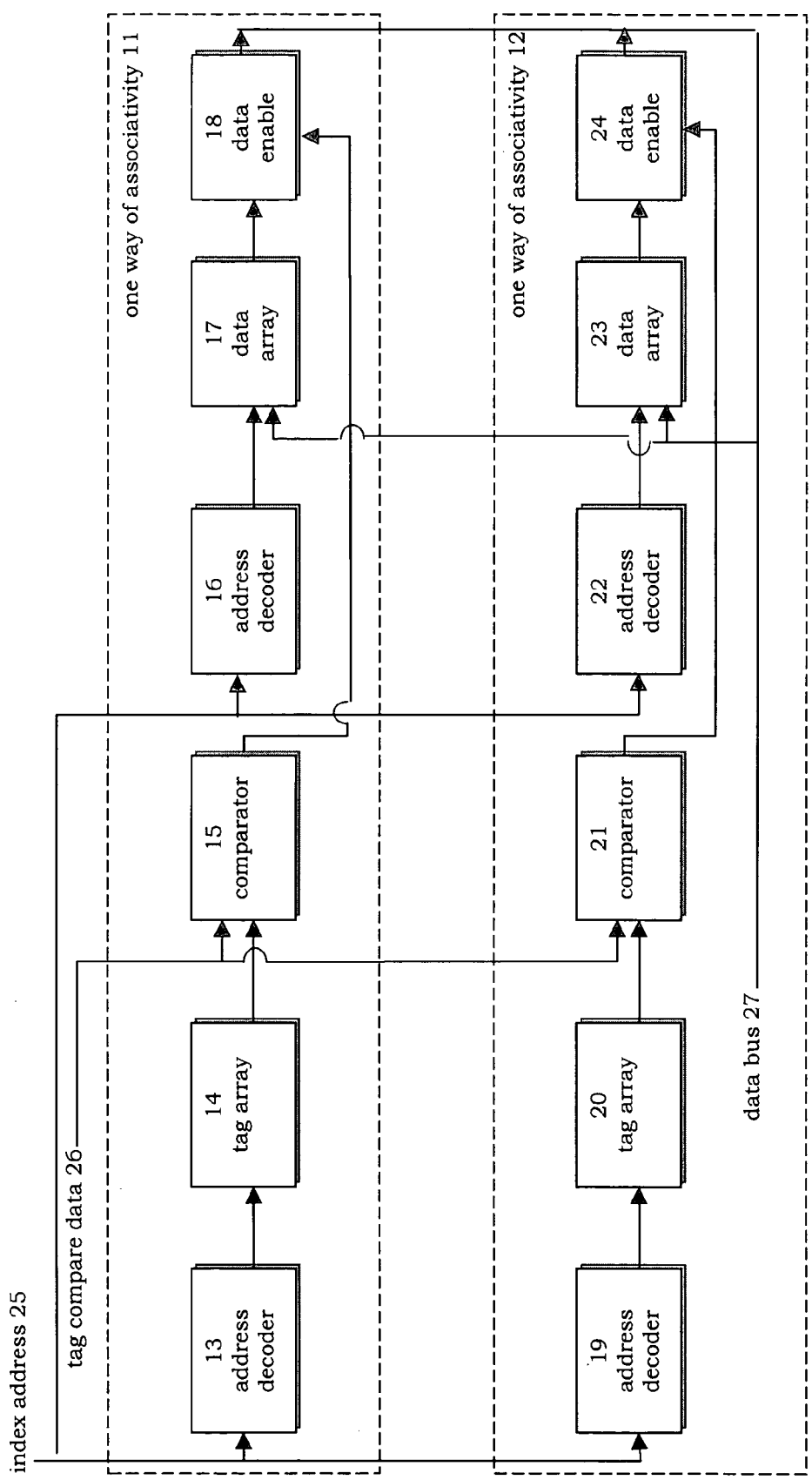
FIG. 1 (Prior Art) is a block diagram illustrating a conventional cache architecture.
Figure 2:
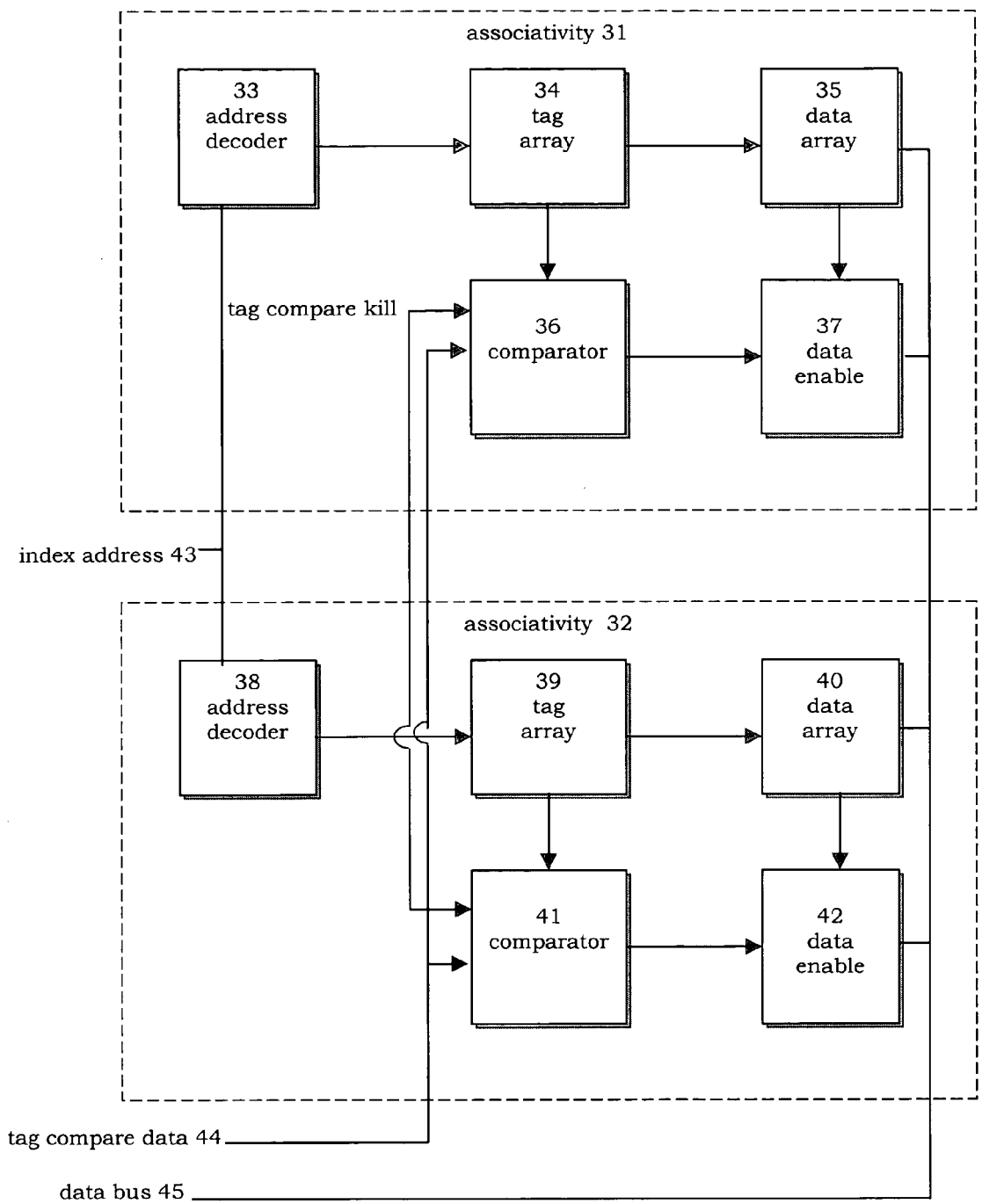
FIG. 2 is a block diagram illustrating a cache pipelined architecture in accordance with the present invention.

FIG. 2 is a block diagram illustrating a cache pipelined architecture 30, with an associativity 31, and an associativity 32. An address decoder 33 is shared by a tag array 34 and data array 35 in associativity 31. Similarly, a common address decoder 38 is used in associativity 32 for decoding with a tag array 39, and a data array 40.

Address decoder 33 serves to decode the incoming index address 43 in associativity 31. Initially, tag array 34 is powered-up without supplying power to data array 35. A comparator 36 compares the tag from tag array 34 with a tag compare data 44. Comparator 36 generates an output signal that enables or disables a data enable 37 for powering up or not powering up data array 35. When data array 35 is powered-up, and there is a tag hit, data enable 37 enables output to place data on a data bus 45.

Similar type of flow is generated through associativity 32. Address decoder 38 decodes the incoming index address 43. Initially, tag array 39 is powered-up without supplying power to data array 40. A comparator 41 compares the tag from tag array 39 with a tag compare data 44. Comparator 41 generates an output signal that enables or disables a data enable 42 on whether to powered-up data array 40. When data array 40 is powered-up, and there is a tag hit, data enable 42 enables output to place data on a data bus 45.

Cache architecture 30 is designed in a serial or pipelined process with only one address decoder, i.e. address decoder 33, rather than two decoders. The serial process allows cache architecture 30 to powered-up tag array 34, while saving power supplied to data array 35 since data array 35 is not powered-up until a next phase if there is a tag hit.

Tag array 34 has an array size which is only a percentage of the array size of data array 35. For example, in one design implementation, the array size in tag array 34 is only 10% relative to the size of data array 35, which would be 90%. In terms of power consumption, tag array 34 draws 10% of power while data array is not powered-on. Therefore, there is a saving of 90% power that is typically required had data array 35 be powered-on simultaneously with tag array 34. The ratio of an array size between tag array 34 and data array 35 is merely an illustration. Other desirable ratio or representation of ratio such as fraction, a portion to, relative to, or similar types of fractional relationship can be designated in the design of associativity 31.

Figure 3:
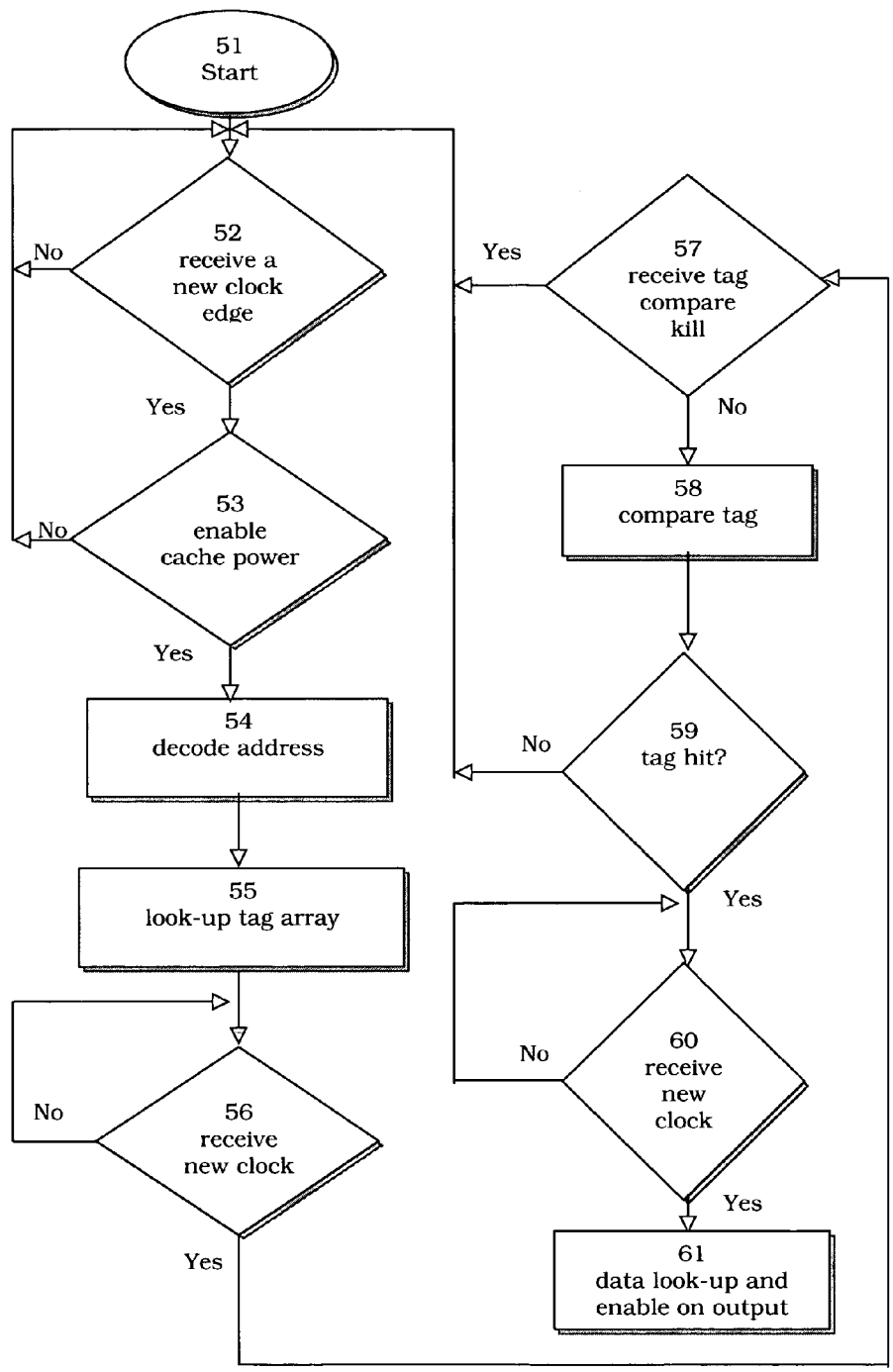
FIG. 3 is a flow diagram illustrating a pipelined cache access in a cache architecture in accordance with the present invention.

FIG. 3 is a flow diagram illustrating a pipelined cache access method 50. Pipelined cache access method 50 starts 51 while waiting 52 for a new clock edge to arrive. If there is no clock edge, pipelined cache method 50 continues to wait for a new clock edge. After a new clock edge has arrived, pipelined cache method 50 detects whether a cache power is enabled 53. When a cache power is enabled, pipelined cache method 50 decodes 54 the index address 43. Pipelined cache method 50 then look-up 55 tag array 34. After a tag in a tag array is found or not found, pipelined cache method 50 waits until the next clock edge to arrive. Optionally, a tag compare kill signal can be added 57 for halting the process flow. If the tag compare kill is not enabled, comparator 36 compares the tag from tag array 34 with tag compare data 44. Pipelined cache method 50 determines 59 whether a tag hit occurs. On the one hand, if comparator 36 generates a tag miss, then the process returns to 51. On the other hand, if comparator 36 determines that there is a tag hit, then pipelined cache method 50 waits 60 until the next block edge arrives. When the next clock edge arrives, pipelined cache method 50 performs 61 a data look-up in data array 35 and enables an output on data bus 45.

Pipelined cache access method 50 is generally divided into three phases or cycles. During the first phase, pipelined cache access method 50 detects 52 a new clock edge, enables or disables 53 cache power, decodes address 54, and look-up 55 of tag array 34. During the second phase, pipelined cache access method 50 receives or did not receive 57 a tag compare kill, compare 58 of a tag from tag array 34 with tag compare data 44, and detects 59 a tag hit or a tag miss. During the third phase, pipelined cache access method 50 performs 61 a data look-up and enables data onto output data bus 45.

Preferably, a wide data is generated from data array 35 to data enable 37 in one-way of associativity 31. Similarly, a wide data is generated from data array 40 to data enable 42 in one- way of associativity 32.

Figure 4:
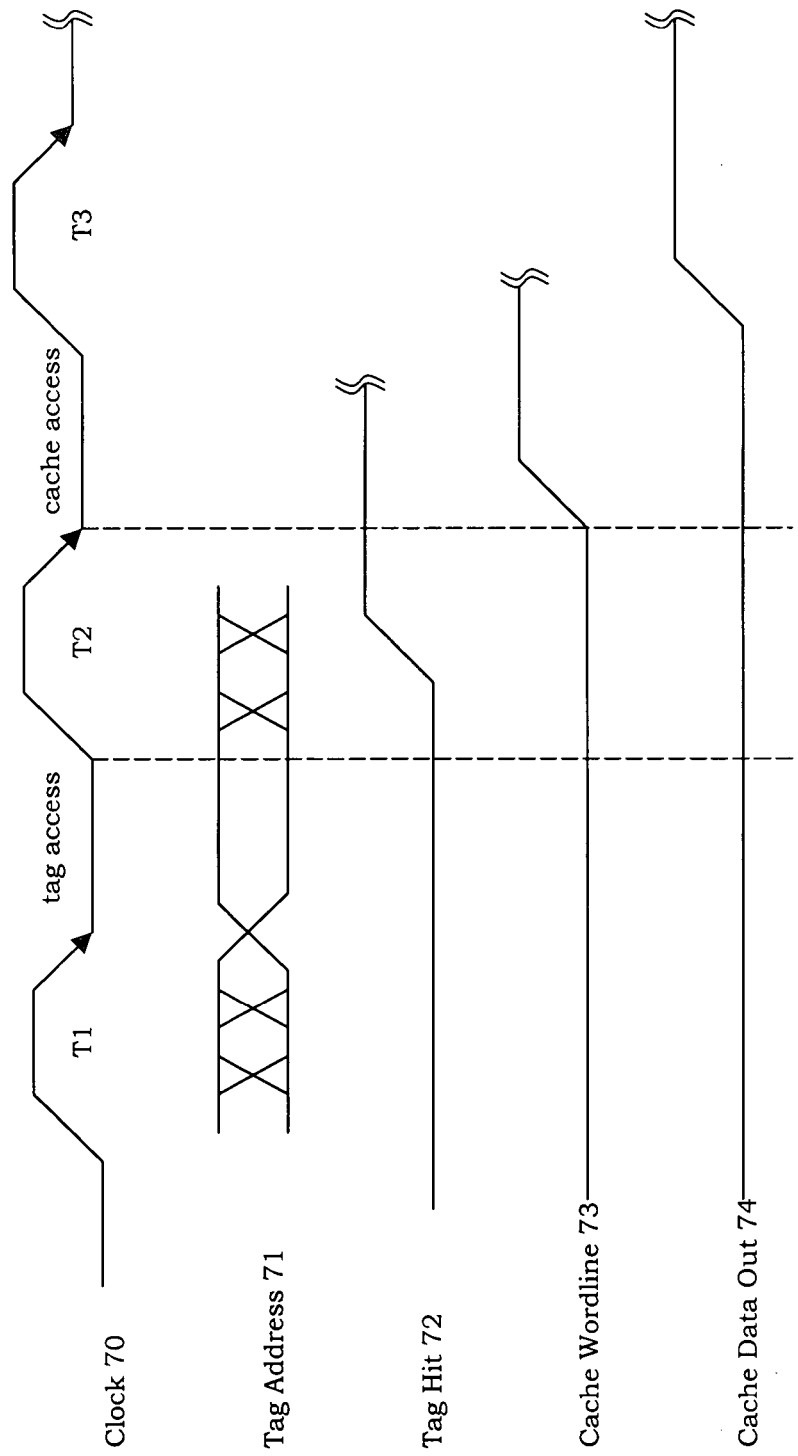
FIG. 4 is a timing diagram illustrating a pipelined cache access in a cache architecture in accordance with the present invention.

FIG. 4 is a timing diagram illustrating a pipelined cache access in a cache pipelined architecture. During a T1 phase, cache pipelined architecture 30 waits to receive a new clock edge from a clock signal 70 in T1 for decoding an index address or tag address 71, and for powering and accessing tag array 34. During a T2 phase, cache pipelined architecture 30 waits to receive a new clock edge in T2 for comparing index address 43 with a tag in tag array 34 to determine whether there is tag hit 72 or tag miss. During a T3 phase, if there is a tag hit, data array 35 is powered-on in T3 where a cache wordline 73 is asserted for locating the corresponding cache line in data array 40. A cache data out signal 74 is enabled in data array 35 for enabling data onto data bus 45.

Optionally, the signals depicted in cache architecture 30 and pipelined cache architecture method 50 can be implemented in various forms. For example, the triggering of a clock signal and a tag compare kill signal can be designed for assertion singularly or in various combinations in address decoder 33, tag array 34, data array 35, comparator 36, or data enable 37. Additionally, one of ordinary skilled in the art should recognize that the block diagram arrangement in cache architecture 30 can be modified in various sequence and combinations to achieve the power-saving in data array 35 while tag array 34 is initially powered-up.

The above embodiments are only illustrative of the principles of this invention and are not intended to limit the invention to the particular embodiments described. For example, it is apparent to one of ordinary skilled in the art that a cache architecture can be implemented as a two-way of associativities, a four-way of associativities, or any binary or odd combination of associativities. Furthermore, although the term "phase", which equals to one-half clock cycle, is used, other types of time units can be implemented, such as self-time, one or more clock cycles, or units less than a phase. The clock 70 can be triggered on a rising edge, a fallen edge, or in response to another signal. Accordingly, various modifications, adaptations, and combinations of various features of the described embodiments can be practiced without departing from the scope of the invention as set forth in the appended claims.

We claim:

1. A scalable pipelined cache architecture with at least a first one-way of associativity, comprising:
   a first tag array, a first data array and a first address decoder shared by both the first tag array and the first data array, the first address decoder having an input for receiving the index address, and having an output coupled directly to the first tag array;
   during a first time unit, said first tag array being powered-up for finding a first tag that corresponds to a received index address;
   a first comparator, coupled to said tag array, for comparing the first tag and a tag compare data;
   during a later second time unit, said first data array coupled to said first tag array, being powered-up if the output from said first comparator indicates that there is a tag hit;
   wherein said first data array contains data which corresponds to the first tag index address.

2. The scalable pipelined cache architecture of claim 1, wherein the power consumed by the first tag array is a fraction of the power consumed by the first data array.

3. The scalable pipelined cache architecture of claim 1, further comprising a data enable circuit having a first input coupled to the comparator, and having a second input coupled to the data array, the data enable circuit enabling data onto a data bus if there is a first tag hit.

4. The scalable pipelined cache architecture of claim 1, further comprising a second one-way of associativity, coupled to the first one-way of associativity, comprising:
   during a first time unit, a second tag array being powered-up for finding a second tag that corresponds to the received index address; and
   a second comparator, coupled to the second tag array, for comparing the second tag and the tag compare data;
   during a later second time unit, a second data array coupled to the second tag array, being powered-up, if the output from said second comparator indicates that there is a second tag hit; wherein said second data array is capable of finding data which corresponds to the second tag index address.

5. The scalable pipelined cache architecture of claim 4, wherein the power consumed by the second tag array is a fraction of the power consumed by the second data array.

6. The scalable pipelined cache architecture of claim 4, further comprising a second data enable circuit having a first input coupled to the second comparator, and having a second input coupled to the second data array, the second data enable circuit enabling data onto a data bus if there is a second tag hit.

7. The scalable pipelined cache architecture of claim 4, further comprising a second address decoder shared by both the second tag array and the second data array, the second address decoder having an input for receiving the index address, and having an output coupled directly to the second tag array.

8. A method for powering a scalable pipelined cache architecture, with at least a first one-way of associativity, comprising the steps of:
decoding an indexing address shared by a first tag array and a first data array;
powering-up the first tag array for finding a first tag that corresponds to the received index address during a first time unit; and
comparing the first tag to a tag compare data; and
if the output from said first tag comparision indicates that there is a tag hit,
in a later second time unit powering-up the first data array coupled to the first tag arrays;
and finding
data in the first data array which corresponds to the first tag using a decoded index address that is coupled directly to the first tag array.

9. The method of claim 8, wherein the power consumed by the first tag array is a fraction of the power consumed by the first data array.

10. The method of claim 8, further comprising the steps of receiving a tag compare kill signal for halting any further activity.

11. The method of claim 8, further comprising the step of enabling data onto a data bus if there is a first tag hit.

12. The method of claim 8, further comprising the step of coupling a second one-way of associativity to the first one-way of associativity, the second one-way associativity comprising,
decoding the indexing address shared by a second tag array and a second data array;
powering-up the second tag array for finding a second tag that corresponds to the receiving index address during a first time unit; and
powering-up the second data array coupled to the second tag array, for finding data which corresponds to the second tag during a later second time unit;
wherein the indexed address is coupled directly to the second tag array.

13. A scalable pipelined cache architecture comprising:
a first tag array, said first tag array being powered-up during a first pipeline cache clock edge, said first tag array being capable of finding a first tag that corresponds to a received index address;
a first comparator, coupled to the said first tag array, for comparing the first tag and a tag compare data;
a first data array coupled to the first tag array, said first data array being powered-up, during a second pipeline cache clock edge that is after the first pipeline cache clock edge, if the output from said first comparator indicates that there is a tag hit;
said first data array being capable of finding data which corresponds to the first tag.

14. The pipelined cache architecture of claim 13, used for a pipelined processor in a computing system.

15. The pipelined architecture of claim 13, wherein said first data array is not powered up if a tag compare kill signal is received.

16. The scalable pipelined cache architecture of claim 13, further comprising a data enable circuit having a first input coupled to the first comparator, and having a second input coupled to the data array, the data enable circuit enabling data onto a data bus if there is a tag hit.

17. A method for powering a scalable pipelined cache architecture, comprising the steps of:
decoding an indexing address suspected of being shared by a first tag array and a first data array;
during at least a first pipeline cache clock edge, powering-up the first tag array for finding a first tag that corresponds to the index address; and
comparing the first tag to a tag compare data; and
if the output from said first tag comparison indicates that there is a tag hit, powering-up the first data array in a later second pipeline cache clock edge.

18. The method of claim 17, used to run a pipelined processor in a computing system.

19. The method of claim 17, wherein said first data array is not powered up if a tag compare kill signal is received.

\* \* \* \* \*